April 8, 1969  C. L. BOSTON  3,437,373
SEAT ASSEMBLY
Filed June 14, 1967  Sheet 1 of 3
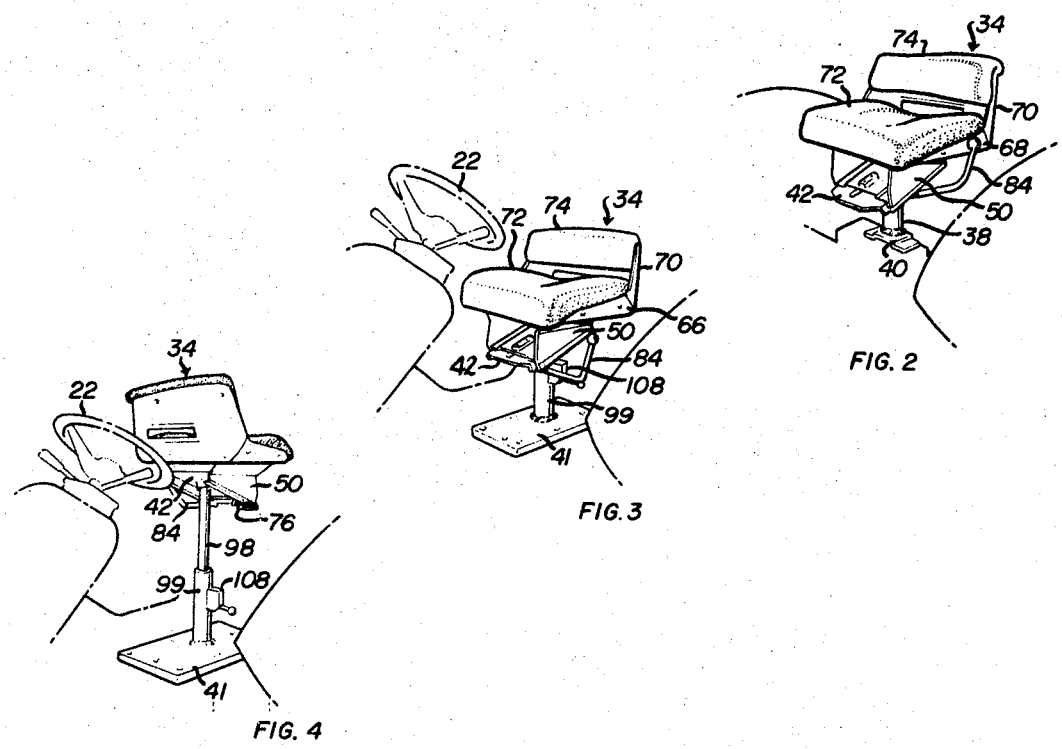
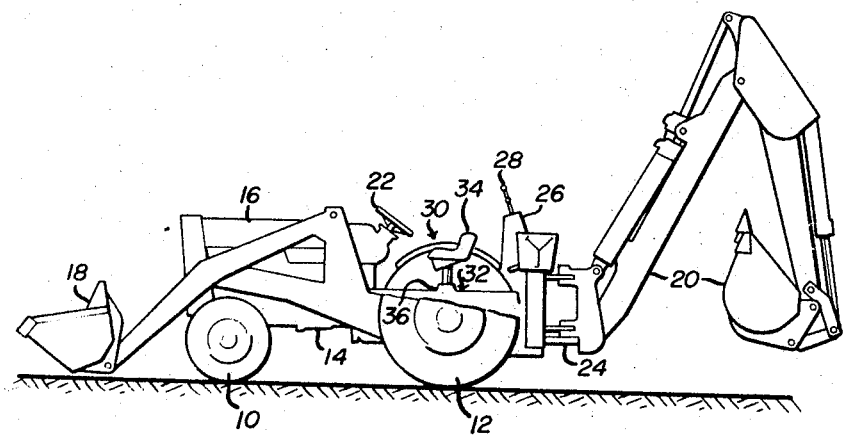
INVENTOR.
CHARLIE L. BOSTON.
BY April 8, 1969

C. L. BOSTON 3,437,373

SEAT ASSEMBLY

Filed June 14, 1967

INVENTOR.
CHARLIE L. BOSTON.

BY

ATT'Y
AG'T

April 8, 1969

C. L. BOSTON 3,437,373

SEAT ASSEMBLY

Filed June 14, 1967

INVENTOR.
CHARLIE L. BOSTON.

BY

ATT'Y
AG'T

United States Patent Office 3,437,373
Patented Apr. 8, 1969

3,437,373
SEAT ASSEMBLY
Charlie L. Boston, West Burlington, Iowa, assignor to J. I. Case Company, Racine, Wis., a corporation of Wisconsin
Filed June 14, 1967, Ser. No. 646,078
Int. Cl. B60n 1/02; A61g 15/00
U.S. Cl. 296—65    4 Claims

ABSTRACT OF THE DISCLOSURE

A post mounted seat including structural means for moving the seat along an inclined support to a desired fore-and-aft and an up-and-down position. A reversible seat for accommodating the vehicle operator in a forwardly facing or a rearwardly facing direction including biased lift means for elevating the seat to the desired position. The assembly provides a combined ramp with pivot means for the operation of vehicle and implement controls.

BACKGROUND OF THE INVENTION

The prior art includes vehicle seats which are mounted on ramps or inclined plane surfaces so as to adjust the seat to the proper position depending on the stature of the operator. A short operator will naturally adjust the seat to a lower and closer position to the vehicle controls and a tall operator will adjust the seat to a higher and farther position from the controls. Seats have also been designed for use on vehicles, which seats include biased or cushioned support means for varying the elevation of the seat itself. In those tractor implement combinations wherein the operator faces forwardly when operating the tractor controls and rearwardly when operating the implement controls, two seats have generally been used. The reason for this is because the operator is usually seated lower when operating the tractor, but he should be seated higher when operating the implement controls for a backhoe or the like. In some cases, the separate seat for the backhoe has been supported from the implement control standard so as to give the operator a clear view of the earth-working operation. This separate seat has usually been of the cantilever type with little or no provision for adjusting it in relation to the implement controls.

The prior art also shows the use of flip-flop seats wherein the cushioned portions are adaptable for both the seat and the backrest. The seat suspension or support is then such that the seat is lower in the forwardly facing direction and higher in the rearwardly facing direction. Some of the seats include a mechanical linkage which also flips with the seat to another position for attaining a different plane of elevation.

This application is of common ownership with application Ser. No. 654,777, filed July 20, 1967, and is an improvement thereover.

SUMMARY OF THE INVENTION

The present invention relates to a seat assembly for a tractor and more particularly to the seat supporting structure wherein the seat is moved along a ramp or inclined surface portion to properly position the operator depending upon his stature. The seat is adjustable in a downwardly and forwardly direction for a short operator and is adjustable in an upwardly and rearwardly direction for the tall operator. The seat assembly also includes structure for simply and easily accomplishing the pivotal movement of the seat and provides a locking means for holding the seat in the desired position. The assembly incorporates an inclined track with pivot means such that the seat can be positioned in the proper attitude for operator's comfort in either the vehicle or the implement operation.

This advancement made in the vehicular seating art realizes the use of one seat for both tractor and implement operation. For tractor operation, the seat is placed at a lower elevation and is moved along the ramp to the desired position. The seat is turned on a pivot post and is also raised to a higher plane for the backhoe operation, as with many of the machines, the backhoe controls are elevated to give the operator a better view of the equipment and the working operation.

The principal object of the present invention is to provide an improved slanted or inclined seat support structure on a vehicle.

Another object is to provide a seat assembly for a vehicle which is reversible for accommodating the operation of separate controls.

A further object is to provide a reversible seat which can be moved to different elevations for operating separate controls.

An additional object is to provide a seat assembly which can be locked in position at the different elevations.

Additional objects and advantages will become apparent from a reading of the following description taken together with the annexed drawings, in which:

FIGURE 1 is a side elevational view of a combination tractor-backhoe embodying the invention;

FIG. 2 is a perspective view of one embodiment of the seat assembly for tractor operation;

FIG. 3 is a perspective view of another embodiment of the seat assembly in relation to the steering wheel and including the locking means;

FIG. 4 is a perspective view of the seat assembly in an elevated position for implement operation;

Figure 5:
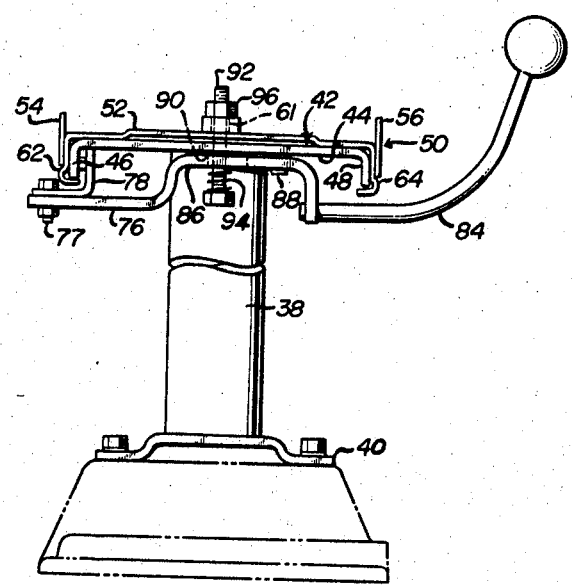
FIG. 5 is a detailed frontal view of the seat support showing the adjusting mechanism.

As seen in FIG. 1 there is shown a combination tractor-backhoe on which the seat assembly is mounted and which will be described as the vehicle and implement used for practicing the invention. The tractor includes front wheels 10 and rear wheels 12, a chassis or frame 14, and an engine 16. The tractor is shown as carrying a front end loader 18 and a backhoe 20. A steering wheel 22 is located rearwardly of the engine in conventional manner and the other tractor controls are adjacent the wheel for obvious purposes. Attached to the rear of the tractor are a backhoe swing tower 24 and a control console 26 with operating handles and levers 28. An operator's station 30 is located on the rear portion of the tractor between the steering wheel and the backhoe controls.

FIG. 1 also shows the rear portion 32 of the tractor which portion includes a transmission, differential and rear axle in conventional manner. The steering wheel 22 is positioned angularly in relation to the rear portion 32 and an operator's seat assembly 34 is supported from portion 32. In actual construction the seat assembly is generally above the differential housing 36. This is better shown in FIG. 2 wherein a support post 38 is connected to a top plate 40 on the housing 36. In this embodiment, the base plate 40 is welded to post 38 and the plate is bolted to the top of the housing. Post 38 extends upwardly from plate 40 and carries a seat support 42. Support 42 is secured, as by welding to post 38 such that the support provides an inclined plane. Plate 40 and post 38 with support 42 may therefore be conveniently removed from the tractor without disturbing the housing. As seen in FIGS. 2 and 3, support 42 is substantially a flat plate with downturned edges inclined in a fore-and-aft direction with respect to the generally horizontal plane of the plate 40. The angle of inclination is in the vicinity of 20 to 25 degrees from the horizontal.

FIG. 2 shows the support post 38 secured to the base plate 40 and to the support 42. This is, in effect, a post construction for a standard seat post for tractor operation as distinguished from a reversible seat assembly for tractor-backhoe operation. Since that portion of the seat assembly, namely, the seat support, the seat frame and cushions, and the seat adjusting means are in both cases quite similar, that portion will be described for only the standard seat construction. FIG. 3 shows another embodiment which incorporates the reversible features and has a support post which is secured to a plate 41. Plate 41 is bolted to the tractor and the particular construction of this post will be described more fully.

Figure 6:
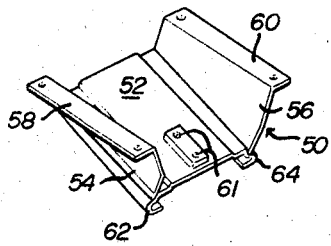
FIG. 6 is a perspective view of the channel assembly which carries the operator's seat.
Figure 7:
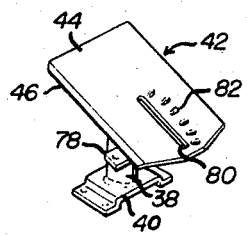
FIG. 7 is a perspective view of the seat support for the channel assembly.

As seen perspectively in FIGS. 2 and 7 and in the enlarged detail in FIG. 5, support 42 as stated, is secured to post 38. Support 42 includes a generally flat inclined or ramp portion 44 and downwardly turned edge portions 46 and 48. The support, therefore, is a ramp for the carrying of the seat downwardly and forwardly and upwardly and rearwardly, these terms being used in the present instance to position the operator and, therefore, viewing in the direction of travel of the tractor. Cooperating with support 42 is a seat mounting assembly 50, shown in perspective in FIG. 6, which is channel-shaped and which includes a generally flat inclined bottom portion 52, side portions 54 and 56, and top portions 58 and 60. Bottom portion 52 is a mating ramp for inclined portion 44 of support 42, shown in perspective in FIG. 7, and includes a pair of holes 61. Mounting assembly 50 also includes guide portions 62 and 64 which are an extension of bottom portion 52. Guide portions 62 and 64 are downwardly and inwardly turned to provide guide tracks for edge portions 46 and 48 of the support 42. As noted in FIG. 5, edge portions 46 and 48 are spaced from the center of ramp portion 44 and guide portions 62 and 64 are spaced outwardly of the edge portions. It is thus seen that guide portions 62 and 64 are directed along and are slidable on edges 46 and 48 of ramp portion 44. Guide portions 62 and 64 follow along these edge portions and also are inwardly turned, as stated above, so as to contain the edge portions. Since the support post 38 and the attached ramp 44 are rigidly secured, the seat mounting channel assembly 50 is slidable on support 42 and along edge portions 46 and 48.

Connected to top portions 58 and 60 by means of bolts is a seat frame 66 which includes a cushion portion 68 and a backrest portion 70. A seat cushion 72 and a backrest 74 are attached to the seat frame as seen in FIGS. 2, 3 and 4. Means for adjusting the seat along the inclined member 42 are provided by a manually releasable mechanism connected to the ramp portion 44 and engageable with the seat mounting assembly 50. A lever 76 is pivotally connected on a pivot pin 77 to a bracket 78, the bracket being secured to one edge portion 46 and also secured to the ramp portion 42 as best seen in FIG. 5. Ramp portion 44, shown in FIG. 7, includes a slot 80 running in the fore-and-aft direction and centrally located in the ramp between edge portions 46 and 48.

The ramp portion 44 also includes a series of openings 82 arcuately formed in relation to pivot pin 77. These openings are spaced from and disposed adjacent slot 80. As stated, lever 76 is connected to bracket 78, the lever extending laterally under the seat forward of post 38, and a handle 84 is attached to the lever. The central portion 86 of the lever is disposed upwardly in an inverted shape and a pin 88 is secured to this portion offset from the centerline of the seat post 38. Portion 86 also includes a bore 90 through which is installed a bolt 92. A spring 94 encircles the bolt adjacent the head thereof and a nut 96 is threaded on the top portion of the bolt. It is seen that bolt 92 is inserted through the bore 90 in lever portion 86, the slot 80 in support 42, and one of the holes 61 in portion 52. The spring 94 keeps the parts in position such that the lever is movable about pivot pin 77 and the bolt rides in a fore-and-aft direction in slot 80 as the handle 84 is moved fore-and-aft. Pin 88 engages in one of openings 82 and maintains the seat in a certain position. When it is desired to move the seat in a fore-and-aft direction the handle 84 is depressed downwardly which compresses spring 94, the pin 88 removing itself from one of the holes 82. The handle is manually moved fore or aft to the desired position and it is then released to return to the up position with pin 88 entering another of the openings 82.

FIGS. 3 and 4 show the seat in perspective views with the reversible features which allow its use also for backhoe control operation. FIG. 3 shows the seat in the lowered position for tractor operation and FIG. 4 shows the relative position of the seat at a different or higher elevation for backhoe operation.

The reversible seat includes many of the features of the standard post seat except that as seen in FIG. 4, the seat support 42 is secured to an inner post 98. Post 98 is of smaller diameter than the standard post such that it is slidable up and down in a post 99. The seat support 42, the channel assembly 50 and the lever means for adjusting the seat along the support shown in FIG. 8 are similar as shown in FIG. 5.

Figure 8:
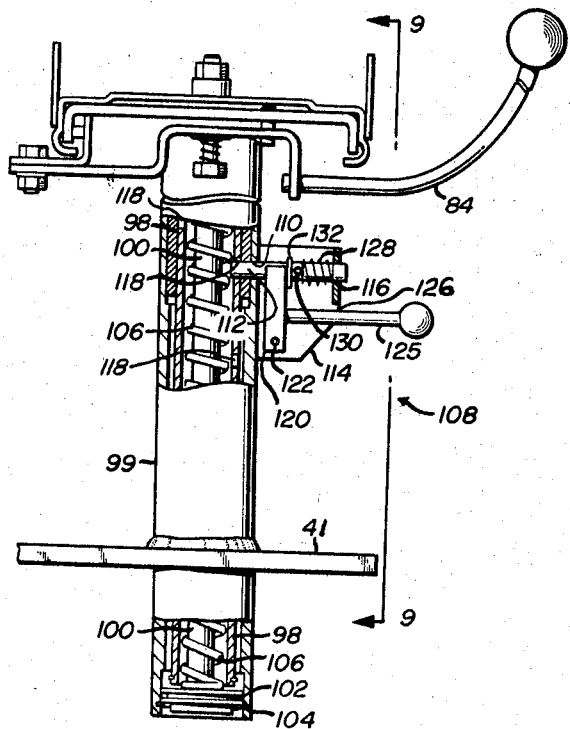
FIG. 8 is a similar view as FIG. 5, partly in section, and showing the lift and locking mechanisms for the reversible seat.

As seen in FIG. 8, a lift guide 100 is positioned within posts 99 and 98. Also FIG. 8 shows the extension of the posts through the cover plate 41 into the differential housing. This extension provides a well for the lift guide and for additional support when the seat is in the raised position. Guide 100 extends upwardly in the posts 98 and 99 short of the support 42 and includes a base 102 and a snap ring 104. Encircling the guide 100 and within post 98 is a compression spring 106 which continually urges the seat upward.

A locking mechanism 108 is attached to the side of post 99 as seen in FIGS. 4 and 8. Post 99 has an opening 110 in one side through which extends a locking pin 112. Mechanism 108 includes a housing 114 having a bore 116 and pin 112 extends through the bore 116. Inner post 98 has a series of bores 118 spaced vertically in one side thereof and aligned with bore 110. Post 98 also includes bores 118 on the side opposite in the upper portion thereof so that the seat can also be adjusted and locked at the lower elevation when operating the tractor controls.

Figure 9:
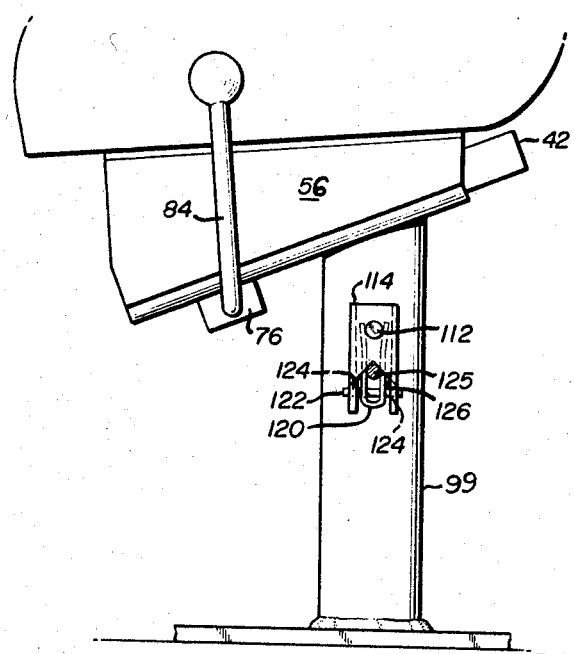
FIG. 9 shows a view of the locking mechanism on the line 9—9 of FIG. 8.

As seen in FIGS. 8 and 9, the locking mechanism includes a clevis 120 pivoted on a pin 122 extending through openings 124 in housing 114. A locking handle 125 is secured to the clevis 120, the handle extending outwardly from the housing through an open downwardly V-shaped portion 126 of the housing. FIG. 8 shows locking pin 112 having a spring 128, a roll pin 130 through the locking pin and a washer 132 adjacent pin 130. Clevis 120 is contained within housing 114 between post 99 and washer 132. It will be noted that as handle 125 is depressed downwardly in open portion 126, clevis 120 pivots on pin 122, the upper portion of the clevis engages washer 132, which in turn urges pin 130 against spring 128. Since pin 130 is secured to locking pin 112 this action causes pin 112 to be moved outwardly and to be withdrawn from the opening in the inner post. The inner post 98 is then free to move and compression spring 106 then acts on the inner post and urges it upwardly, thus raising the seat to the desired elevation. At the desired elevation, handle 125 is released and the pin 112 enters another of the bores 118 aligned with bore 110 and the seat is locked in the up position. When it is desired to lower the seat, handle 125 is depressed and the operator's weight forces the seat down to the lower elevation where the seat is again locked in position.

It is thus seen that herein shown and described is an adjustable seat structure for a tractor which is simple, economical, and practical. The seat structures as herein shown and described accomplish all the objects and advantages as set out above. The addition of the reversibility and locking features to the basic seat mounting also provides for one seat to be used for either tractor or backhoe operation.

The seat assembly provides for adjustability in the up-and-down and fore-and-aft directions for both the tractor and backhoe operating positions. The seat is easily adjusted to the desired position for the convenience of the operator which, of course, is becoming more important on those vehicles with sensitive controls.

What is claimed as new and desired to be secured by Letters Patent of the United States is:

1. A seat assembly for a tractor having an implement on the rear thereof and having a control for operating said implement and another control for operating said tractor, including a base member connected to the tractor, an upwardly extending hollow support post secured to and extending through said base member intermediate said controls, an inner post axially slidable and rotatable in said support post, a seat support on the upper end of said inner post and rotatable therewith, said seat support having an inclined surface in the fore-and-aft direction, a channel assembly having spaced guide tracks engageable with and slidable on said seat support for fore-and-aft and up-and-down adjustment of said channel assembly on said seat support, a seat on said channel assembly and including a seat bottom portion and a seat back portion, said seat support and said channel assembly with said seat being adapted to be rotated between positions of having said seat alternately face each of said controls for supporting an operator in a facing seated position for alternately operating the tractor and the implement, adjusting means interconnected between said seat support and said channel assembly for adjustably securing said channel assembly in selected positions along said inclined surface of said seat support, resilient means in said support post and operative on said seat support for urging said seat upwardly, and releasable lock means operative between said support post and said inner post for securing the latter in selected axially adjusted positions relative to said support post.

2. A seat assembly in accordance with claim 1, wherein said releasable lock means includes adjustment means on opposite sides of said inner post for locking said inner post and said seat in rotated positions relative to said support post to have said seat face either of said controls.

3. A seat assembly in accordance with claim 1, wherein said inclined surface has a plurality of a row of holes and said adjusting means is pivotally mounted on said seat support and carries a pin which is releasably received in any selected one of said holes for the connection between said adjusting means and said channel assembly in releasably securing said channel assembly in selected positions along said inclined surface of said seat support.

4. A seat assembly in accordance with claim 3, wherein said inclined surface has a slot disposed parallel with said row of holes, and said adjusting means has a member extending through said slot and connected to said channel assembly for displacement of the latter with respect to said seat support upon pivot of said adjusting means.

References Cited
UNITED STATES PATENTS

| | | | |
|---|---|---|---|
| 2,048,148 | 7/1936 | Stoll | 248—408 |
| 2,312,030 | 2/1943 | Cramer et al. | 248—418 |
| 2,604,925 | 7/1952 | Swift | 248—407 |
| 2,664,941 | 1/1954 | Gillespie | 248—418 |
| 2,865,430 | 12/1958 | Folkner | 248—408 |
| 2,892,486 | 6/1959 | Herring et al. | 248—420 |
| 2,932,341 | 4/1960 | Morrison et al. | 248—420 |
| 2,946,373 | 7/1960 | McCanse et al. | 248—421 |

BENJAMIN HERSH, Primary Examiner.

L. D. MORRIS, JR., Assistant Examiner.

U.S. Cl. X.R.

297—349